United States Patent
Furuya et al.

(10) Patent No.: US 8,449,710 B2
(45) Date of Patent: May 28, 2013

(54) SHEET PEELING MACHINE AND METHOD FOR MANUFACTURING DISPLAY DEVICE

(75) Inventors: Masaaki Furuya, Yokohama (JP); Tomohiro Matsui, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 264 days.

(21) Appl. No.: 12/854,458

(22) Filed: Aug. 11, 2010

(65) Prior Publication Data

US 2011/0041993 A1 Feb. 24, 2011

(30) Foreign Application Priority Data

Aug. 19, 2009 (JP) .................. 2009-190347

(51) Int. Cl.
*B32B 38/10* (2006.01)
(52) U.S. Cl.
USPC ........... 156/249; 156/247; 156/248; 156/750; 156/761
(58) Field of Classification Search
USPC .......... 156/247–249, 701, 761–766; 399/399; 118/100
See application file for complete search history.

(56) References Cited

U.S. PATENT DOCUMENTS

| | | | |
|---|---|---|---|
| 6,723,199 B1 * | 4/2004 | Akitomo et al. | 156/248 |
| 2006/0131260 A1 * | 6/2006 | Okuyama et al. | 216/13 |
| 2010/0075563 A1 | 3/2010 | Matsui et al. | |

FOREIGN PATENT DOCUMENTS

| | | |
|---|---|---|
| JP | 8-108966 | 4/1996 |
| JP | 10-115827 | 5/1998 |
| JP | 2007-254743 | 10/2007 |
| JP | 2008-10221 | 1/2008 |
| JP | 2010-221611 | 10/2010 |

OTHER PUBLICATIONS

U.S. Appl. No. 13/038,542, filed Mar. 2, 2011, Matsui, et al.
Office Action issued Jul. 12, 2011 in Japan Application No. 2009-190347 (With English Translation).
U.S. Appl. No. 12/721,098, filed Mar. 10, 2010, Tomohiro Matsui, et al.
Korean Office Action issued Oct. 25, 2011, in Patent Application No. 10-2010-79796 (with English-language translation).

* cited by examiner

*Primary Examiner* — Katarzyna Wyrozebski Lee
*Assistant Examiner* — Carson Gross
(74) *Attorney, Agent, or Firm* — Oblon, Spivak, McClelland, Maier & Neustadt, L.L.P.

(57) ABSTRACT

A sheet peeling machine includes a movable table for moving a substrate in a moving direction, a planar member, a holder for holding the planar member; an elevating unit for supporting the holder and moving the holder in an elevating direction, a forwarding unit for contacting an end of the planar member with an edge of a sheet member on the substrate, a tape roller for affixing a peeling tape from the planar member and the sheet member, and a tape wind-up unit for peeling off the sheet member together with the peeling tape. According to the sheet peeling machine, the peeling tape is affixed onto the sheet member and then the sheet member is peeled off together with the peeling tape with a support by the planar member.

3 Claims, 13 Drawing Sheets

(1) Initial Position (2) Knife Moved Forward (3) Knife Moved Downward (4) Knife Moved Forward
Edge Contact Detection

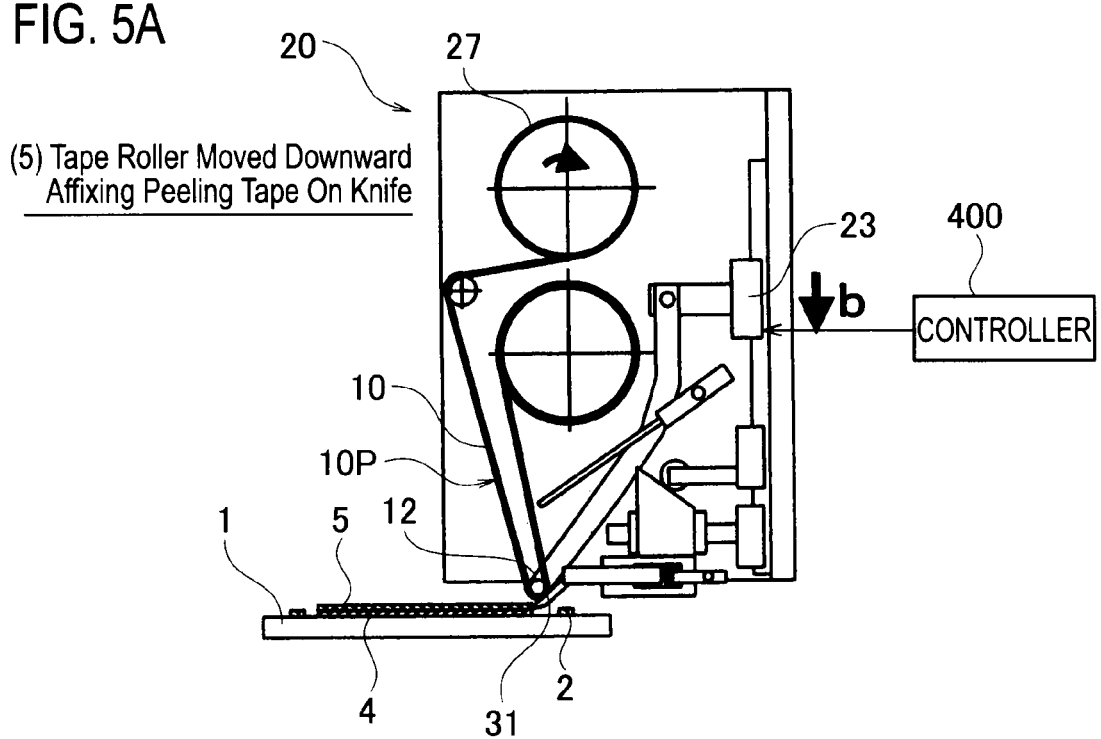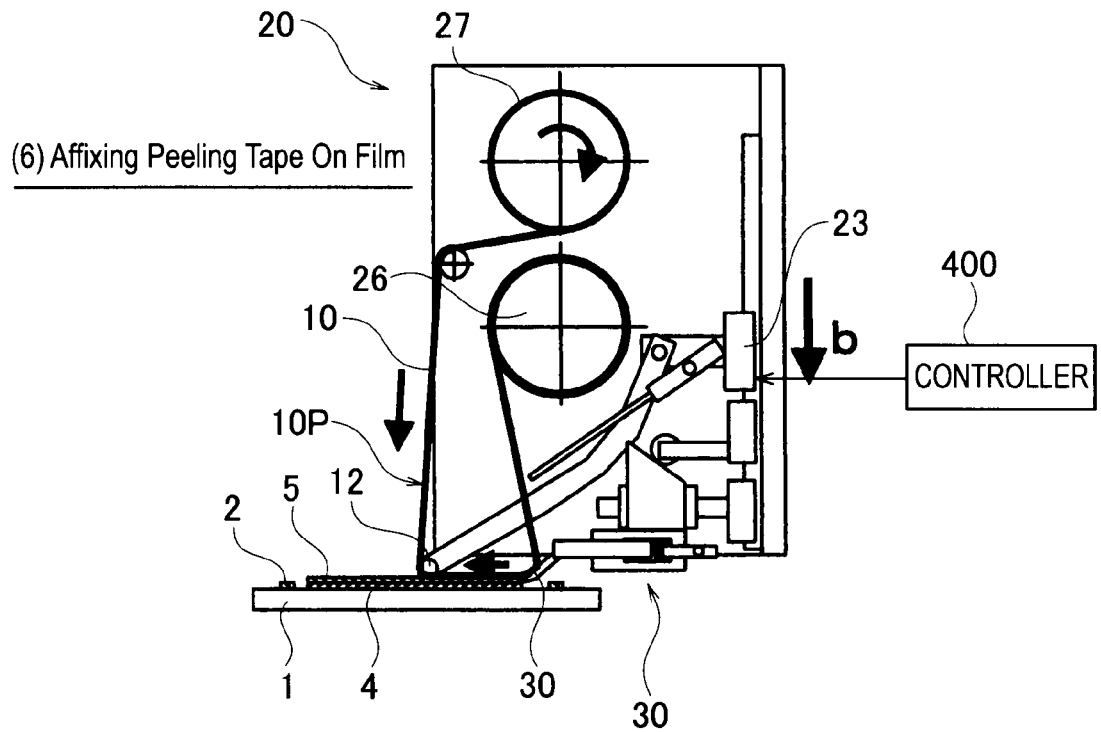

(7) Winding-Up Peeling Tape (8) Winding-Up Peeling Tape Knife Unit & Tape Roller Moved To Initial Position (9) Finish of Winding-Up

SHEET PEELING MACHINE AND METHOD FOR MANUFACTURING DISPLAY DEVICE

CROSS-REFERENCE TO RELATED APPLICATION

This application is based upon and claims the benefit of priority from Japanese Patent Application No. 2009-190347, filed Aug. 19, 2009; the entire contents of which are incorporated herein by reference.

BACKGROUND

1. Field

Embodiments described herein relate generally to a sheet peeling machine and a method for manufacturing a display device.

2. Description of Related Art

FIG. 12 shows an example in which a protect film 9 is peeled from an adhesive 4 on a rear surface of an adhesive sheet 3 by an adhesive peeling tape 10. The protect film 9 that has the same size as that of the adhesive sheet 3 is affixed to the adhesive sheet 3 by the adhesive 4. When the protect film 9 is peeled from the adhesive 4 on the adhesive sheet 3, an edge base 11 is used. The adhesive peeling tape 10 is laid on the edge base 11 with its adhesive surface 10P up. The protect film 9 is further laid on the adhesive surface 10P of the adhesive peeling tape 10, so that the protect film 9 is affixed onto the adhesive peeling tape 10. An edge of the protect film 9 can be peeled from the adhesive 4 on the adhesive sheet 3 by pulling the protect film 9 obliquely downward from an edge of the edge base 11 via the adhesive peeling tape 10 along a direction of an arrow shown in the drawing.

In this manner, the protect film 9 can be continuously peeled from the adhesive 4 on the adhesive sheet 3 by pulling the adhesive peeling tape 10 obliquely downward from the edge base 11. Such a peeling method of the protect film 9 is commonly applied to a process of affixing a polarizing plate of a liquid crystal display (LCD) device. This method is effective in handling, with effortless, the adhesive sheet 3 from which the protect film 9 has been peeled off.

In addition, FIG. 13 shows another conventional example in which an protect film 5 is peeled from an adhesive 4 while the adhesive 4 is still remained on a surface of a substrate 1. Such a peeling method of the protect film 5 is commonly applied to a case where the substrate 1 is fixed and cannot be handled with effortless. An adhesive surface 10P of the adhesive peeling tape 10 is affixed onto the protect film 5 and then the protect film 5 is peeled from its edge by the adhesive peeling tape 10. This method is effective in a case where it is needed to form the adhesive 4 on the substrate 1 and then remove the protect film 5 from the adhesive 4.

Further, a Patent Document 1 (Japanese Patent Application Laid-Open No. 2008-10221) discloses a peeling machine of a masking tape. The peeling machine intends to improve sealing reliability between a substrate and another substrate when affixing the substrates each other. The peeling method in this conventional example is shown in FIG. 14. As shown in FIG. 3, an adhesive surface of an adhesive peeling tape 10 is pressed onto a protect film (masking tape) 5 by a roller 13 and then the roller 13 is moved relatively to a substrate 1, so that the protect film 5 is peeled.

SUMMARY

In the above-mentioned conventional peeling methods, the adhesive peeling tape may stick to a surface of a substrate if a total thickness of an adhesive and a protect film to be peeled from the adhesive is lower than 100 μm. In addition, an adhesive surface of an adhesive peeling tape must be strongly affixed to an edge of a protect film (the masking tape in the Patent Document 1) if adhesive strength of the protect film to be peeled is strong. Therefore, it is effective to affix the adhesive peeling tape to a substrate proactively in such a case. If the adhesive surface of the adhesive peeling tape is not firmly affixed to the protect film and the substrate, only the adhesive peeling tape may be peeled and the protect film may remains on the adhesive. As a result, the protect film needed to be peeled may not be peeled unfailingly from the adhesive.

Recently, in a flat panel display device using an organic EL (electroluminescent) display or the like, it is applied as a method for effective utilization of its "thin thickness" feature and its protection to affix an adhesive sheet as a protector on a luminescent layer formed of layered films or an electrode. In these cases, a resign material used as the protector is mostly supplied in a configuration in which protect films are affixed to both sides of the protector. Therefore, it is needed to peel off the protect films from the protector after they are affixed onto a substrate on which elements have been formed or a substrate opposing to a material to be protected. On peeling the protect films, it is needed to prevent an adhesive surface of an adhesive peeling tape from being affixed onto a surface of the substrate on which elements have been formed or elements on the opposing substrate, because the adhesive surface of the adhesive peeling tape may cause contaminant particles to the elements on the surface of the substrate and the surface of the opposing substrate.

FIG. 15A shows a sealing substrate 6 in an organic EL panel. FIG. 16 shows an assembly configuration example of the organic EL panel.

As shown in FIG. 15B, in the sealing substrate 6 before affixed with a luminous-element substrate (opposing substrate) 7, an adhesive sheet 3 has a two-layered structure formed of an adhesive 4 and a protect film 5. In addition, as shown FIG. 16, the sealing substrate 6 is affixed with the luminous-element substrate 7 by contacting its frit frame 2 with the luminous-element substrate 7 and then melting the frit frame 2. Since the adhesive sheet 3 has the two-layered structure formed of the adhesive 4 and the protect film 5 before affixing the both substrates 6 and 7, it is needed before affixing the both substrates 6 and 7 to peel off the protect film 5 from the adhesive 4 using an adhesive peeling tape.

Therefore, on peeling the protect film 5, an adhesive surface of the adhesive peeling tape is affixed to a surface of the protect film 5 and then the protect film 5 is peeled from the adhesive 4 together with the adhesive peeling tape. However, if the adhesive surface of the adhesive peeling tape contacts with the frit frame 2 surrounding the protect film 5, a melting surface of the frit frame 2 is contaminated by an adhesive of the adhesive surface of the adhesive peeling tape or contaminants adhered on the adhesive. As a result, sufficient welding strengthen cannot be obtained by the frit frame 2 and insufficient welding causes a leak path at the frit frame 2.

An object of the present invention is to provide a sheet peeling machine and a method for manufacturing a display device to solve the above-mentioned problems.

A first aspect of the present invention provides a peeling machine that includes a movable table capable of moving a substrate laid on the movable table in a moving direction; a planar member; a holder that holds the planar member; an elevating member capable of moving the holder in an elevating direction perpendicular to the moving direction (the holder is supported by the elevating member and capable of moving parallel to the moving direction); a forwarding unit capable of contacting an end of the planar member with an edge of a sheet member on the substrate on the movable table by pushing the holder parallel to the moving direction to forward the planar member after elevating the holder downward in the elevating direction by the elevating member; a tape roller for affixing a peeling tape on the planar member and the sheet member on the substrate by pressing the peeling tape while being moved in an opposite direction to the moving direction; and a tape wind-up unit for peeling off the sheet member by winding up the peeling tape while the movable table is moved in the moving direction.

According to the first aspect of the present invention, when peeling the sheet member affixed on the substrate by affixing the peeling tape to the sheet member, the sheet member can be unfailingly peeled without contacting the peeling tape with a surface of the substrate or an area formed on the surface. Specifically, the peeling tape can be affixed from the planar member to the sheet member while being pressed. Especially, the peeling tape can be affixed onto an edge of the sheet member while being strongly pressed onto the edge. In addition, the sheet member can be peeled off without contacting the peeling tape with the surface of the substrate.

It is preferable that the sheet member is provided with an adhesive layer and affixed on the substrate via the adhesive layer and the end of the planar member is formed as a knife-edge. The end of the planar member is contacted with an edge of the adhesive layer of the sheet member.

According to this configuration, even if the adhesive layer spreads over the edge of the sheet member, the sheet member can be unfailingly separated from the adhesive layer due to the knife-edge of the planar member. In addition, the edge of the planar member can be set unfailingly by contacting with the adhesive layer under the sheet member. The adhesive strength of the peeling tape onto the sheet member can become large due to an existence of a gap between the planar member and the sheet member. Further, the peeling tape can be peeled off stably due to a constant angle between the substrate and the planar member, and thereby reliability of the peeling operation can be improved.

It is preferable that the sheet member is provided with an adhesive layer and affixed on the substrate via the adhesive layer, the planar member is a thin plate member, and the end of the planar member is contacted with an edge of the adhesive layer of the sheet member.

According to this configuration, even if the adhesive layer spreads over the edge of the sheet member, the sheet member can be unfailingly separated from the adhesive layer due to the thin plate member. In addition, the edge of the planar member can be set unfailingly by contacting with the adhesive layer under the sheet member. The adhesive strength of the peeling tape onto the sheet member can become large due to an existence of a gap between the planar member and the sheet member. Further, the peeling tape can be peeled off stably due to a constant angle between the substrate and the planar member, and thereby reliability of the peeling operation can be improved.

A second aspect of the present invention provides a method for manufacturing a display device in which a sheet member is peeled off from a substrate by a sheet peeling machine according to the above-mentioned first aspect of the invention, the sheet member is provided with an adhesive layer and affixed on a sealing substrate via the adhesive layer, and the display device includes a luminous-element substrate as a component thereof. The method includes: affixing the sheet member onto the sealing substrate, the sealing substrate being identical to the substrate; peeling off the sheet member using the peeling machine; affixing the sealing substrate to the luminous-element substrate via the adhesive layer remained on the sealing substrate; heating the adhesive layer for melting the adhesive layer; and cooling the melted adhesive layer for making the melted adhesive layer solidified.

According to the second aspect of the present invention, when peeling the sheet member affixed on the substrate via the adhesive by affixing the peeling tape to the sheet member, the sheet member can be unfailingly peeled off without contacting the peeling tape with a surface of the substrate or an area formed on the surface.

BRIEF DESCRIPTION OF DRAWINGS

FIG. 5A is a transparent side view of the sheet peeling unit when a tape roller is moved downward and a adhesive peeling tape is affixed from the knife;

FIG. 5B is a transparent side view of the sheet peeling unit when the adhesive peeling tape is affixed over the protect film;

DETAILED DESCRIPTION OF EMBODIMENT

Hereinafter, an embodiment is explained with reference to the drawings.

Figure 1:
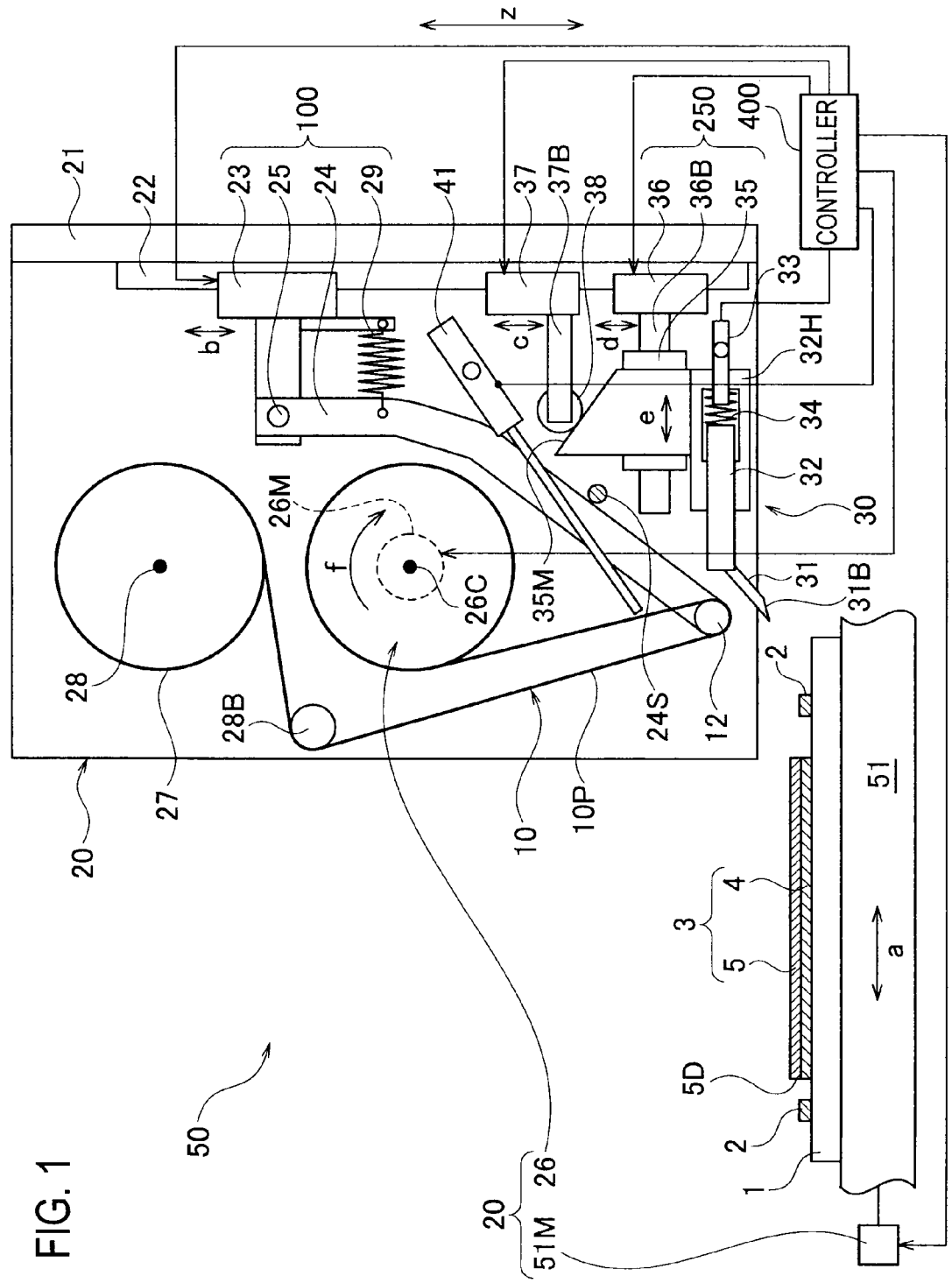
FIG. 1 is a transparent side view of a sheet peeling unit in a peeling machine according to an embodiment.
Figure 2:
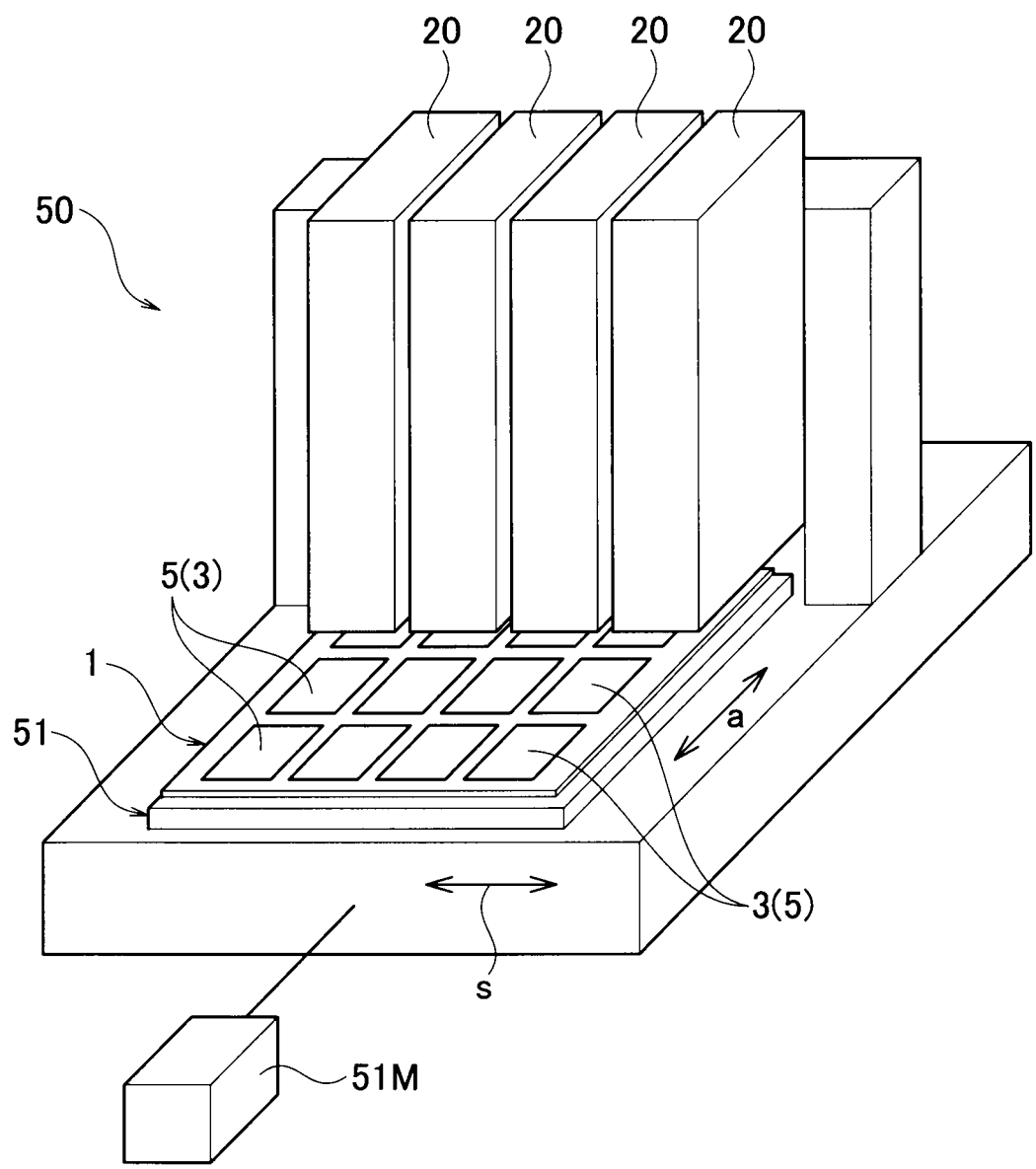
FIG. 2 is a perspective view showing a configuration example of the peeling machine with a plurality of sheet peeling units shown in FIG. 1.

A sheet peeling machine 50 shown in FIG. 2 includes plural sheet peeling units 20 with a configuration shown in FIG. 1.

The sheet peeling unit 20 includes a knife (planar member) 31, an affixing mechanism unit 100 and a peeling mechanism unit 200. The knife 31 is a metal planar member, for example, and its end edge 31B is formed as a knife-edge with a sharp edge. However, the end edge 31B of the knife 31 may be a simple open edge of the planar member instead of the knife-edge (edge shape of knife blade). In any cases, the end edge 31B of the knife 31 is adopted so as to have a shape capable of being inserted into an adhesive (layer) 4 shown in FIG. 1. The knife 31 defines a start position for affixing a peeling tape 10, and a portion of the peeling tape 10 is affixed on the knife 31.

As shown in FIG. 1, the sheet peeling unit 20 has a base plate 21 that is extended along a Z-direction (vertical direction). A liner guide shaft 22 is provided along the Z-direction on the base plate 21. A roller guide 23, a knife forwarding guide (forwarding unit) 37 and a knife elevating guide (elevating unit) 36 are provided on the liner guide shaft 22.

The roller guide 23 can be moved and stopped along the liner guide shaft 22 in a b-direction (see FIG. 1). The knife forwarding guide 37 can be moved and stopped along the liner guide shaft 22 in a c-direction (see FIG. 1). The knife elevating guide 36 can be moved and stopped along the liner guide shaft 22 in a d-direction (see FIG. 1). The b-, c-, d-directions are apparel to the Z-direction.

Each of the roller guide 23, the knife forwarding guide 37 and the knife elevating guide 36 is coupled with its own holder that independently moves, respectively. The roller guide 23, the knife forwarding guide 37 and the knife elevating guide 36 can move independently from each other along the liner guide shaft 22. The holder may be provided with a motor, a feed screw coupled with an output shaft of the motor and a nut screwed with the feed screw, for example. Alternatively, a liner motor can be used.

First, explained are the knife elevating guide 36 located lowermost in FIG. 1 and its surrounding mechanism that is moved in the d-direction by the knife elevating guide 36.

A knife holder 35 is movably provided on a guide body 36B of the knife forwarding guide 36, and a knife unit 30 is held on a bottom of the knife holder 35. The knife holder 35 can move along the guide body 36B in an e-direction (FIG. 1), so that the knife unit 30 is moved in the e-direction. The e-direction is a horizontal direction perpendicular to the Z-direction.

The knife unit 30 includes a knife rod 32 holding the knife 31, a rod holder 32H and a spring 34. The knife 31 is held at an end of the knife rod 32, and another end of the knife rod 32 is held within the rod holder 32H. Within the rod holder 32H, the spring 34 is provided between the other end of the knife rod 32 and an inner wall of the rod holder 32. A position of the knife 31 is set at a forward-most position by an urging force of the spring 34. When the knife 31 is pushed backward, the knife 31 can be moved along the e-direction against the urging force of the spring 34. A knife contact sensor 33 detects a relative displacement of the knife 31 in the knife unit 30.

The knife forwarding guide 37 is positioned above the knife elevating guide 36 and provided with a guide body 37B. A cum roller 38 is rotatably attached at an end of the guide body 37B. An upper surface of the above-mentioned holder 35 is formed as an inclined guide surface 35M. Therefore, the cum roller 38 is guided by the guide surface 35M while the knife forwarding guide 37 is moved in the c-direction, so that the holder 35 and the knife unit 30 are moved and stopped along the e-direction.

Next, explained are the roller guide 23 located uppermost and its surrounding mechanism that is moved in the b-direction by the roller guide 23.

An upper end of a roller arm 24 is attached to the roller guide 23 via an arm pivot 25 and the roller arm 24 can be swung about of the arm pivot 25. A tape roller 12 is rotatably attached to a lower end of the roller arm 24.

A tension spring 29 is attached between the roller arm 24 and the roller guide 23. When the tape roller 12 is moved so as to be distanced from the knife 31, a pullback force is generated due to a tension force of the tension spring 29. A default position of the roller arm 24 is regulated by a stopper 24S at an angle position shown in FIG. 1, and an initial tension force is still generated by the tension spring 29 in such a state.

The tape roller 12 has a cylindrical shape and its rotational axis (not shown explicitly) is provided at the lower end of the roller arm 24. The tape roller 12 moves together with the roller arm 24 and can rotate about the rotational axis. An adhesive peeling tape 10 is hooked around the tape roller 12 and an adhesive surface 10P of the adhesive peeling tape 10 is exposed outward. In other words, in a state where the adhesive peeling tape 10 is hooked around the tape roller 12, the adhesive surface 10P doesn't stick to the tape roller 12 and faces the knife 31.

As shown in FIG. 1, the base plate 21 is provided with a peeling tape axis 28, a tape wind-up mechanism (tape wind-up unit) 26 and a guide roller 28B. The peeling tape axis 28 is located above the tape wind-up mechanism 26. The tape wind-up mechanism 26 is provided at an intermediate portion of the base plate 21, i.e. between the peeling tape axis 28 and the tape roller 12. The adhesive peeling tape 10 is wound around a peeling tape supply roller 27. The peeling tape supply roller 27 is installed on the peeling tape axis 28 and detachable from the peeling tape axis 28. The adhesive peeling tape 10 pulled out from the peeling tape supply roller 27 is to be wound up around the tape wind-up mechanism 26 via the guide roller 28B and the tape roller 12.

As shown in FIG. 1, the tape wind-up mechanism 26 can be driven in an f-direction by a drive mechanism 26M. The tape wind-up mechanism 26 is driven about its center axis 26C, so that the adhesive peeling tape 10 is wound-up on a circumferential surface of the tape wind-up mechanism 26. A film-end sensor 41 is provided between the tape roller and the tape wind-up mechanism 26. For example, the film-end sensor 41 is an optical sensor having a light emitter and a light receiver, and can detect whether or not an end edge 5D of a protect film 5 that has been removed by the adhesive peeling tape 10 passes through.

Next, a configuration explain of the sheet peeling machine 50 is explained hereinafter with reference to FIG. 2.

The plural sheet peeling units 20 shown in FIG. 1 are implemented on the sheet peeling machine 50 shown in FIG. 1. As shown in FIG. 2, the sheet peeling machine 50 is provided with a movable table 51. The movable table 51 can be moved and stopped in an a-direction (cf. FIG. 1) by a drive unit 51M. The a-direction is a horizontal direction parallel to the e-direction, as shown in FIG. 1.

For example, the drive unit 51M of the movable table 51 is provided with a motor, a feed screw rotated by the motor, and a nut provided on the movable table 51 and screwed with the feed screw. Alternatively, the drive unit 51M may be configured with a liner motor or the like.

The substrate 1 is detachably fixed on the movable table 51 shown in FIG. 2 after its alignment has been set. Plural adhesive sheets 3 are affixed on the substrate 1 in a matrix manner along the a-direction and an s-direction perpendicular to the a-direction. Each of the sheet peeling units 20 is arranged with matched to each pitch of columns of the adhesive sheets 3 or installed with its position adjustable. Four of the sheet peeling units 20 are aligned in an example shown in FIG. 2, but the number of sheet peeling units 20 to be provided is not limited to the example and can be arbitrarily determined.

Note that the substrate 1 shown in FIG. 1 is depicted with only one adhesive sheet 3 among the plural adhesive sheets 3 in the matrix manner shown in FIG. 2 in order to make the explanations more easily understandable. As shown in FIG. 1, the adhesive sheet 3 is a layered member composed of the adhesive (layer) 4 and the protect film 5. In other words, the protect film (sheet member) 5 is provided with the adhesive (layer) 4 to constitute the adhesive sheet 3 as a whole. The protect film 5 is affixed onto the substrate 1 via the adhesive 4 at an area within a frit frame 2. The substrate 1 can be moved and stopped in the a-direction shown in FIG. 1 by the movable table 51 shown in FIG. 2.

As shown in FIG. 1, the affixing mechanism unit 100 is composed of the roller arm 24, the roller guide 23, the tape roller 12 and the tension spring 29. The affixing mechanism unit 100 affixes the adhesive surface 10P of the adhesive peeling tape 10 continuously from the knife (planar member) 31 whose end edge 31B has been set at the edge 5B (see FIG. 7A) of the protect film (sheet member) 5 to the protect film 5 by pressing the adhesive peeling tape 10 onto the knife 31 and the protect file 5 via the tape roller 12.

In addition, as shown in FIG. 1, the peeling mechanism unit 200 is composed of the tape wind-up mechanism 26, the drive unit 51m of the movable table 51 and a displacing unit 250 of the knife (planar member) 31. The peeling mechanism unit 200 is used to peel the affixed adhesive peeling tape 10 from the knife 31 and then remove the protect film 5 together with the peeled adhesive peeling tape 10.

The tape wind-up mechanism 26 winds up the adhesive peeling tape 10. The drive unit 51M of the movable table 51 moves the substrate 1 on which the protect film 5 is affixed in a direction parallel to a plane of the protect film 5 and opposite to an affixing direction of the adhesive peeling tape 10, so that the protect film 5 is removed from the adhesive 4.

Further, as shown in FIG. 1, the displacing unit 250 of the knife 31 is composed of the knife elevating guide 36, knife holder 35 and the knife unit 30. The displacing unit 250 can peel the end edge 5D of the protect film 5 from the adhesive 4 together with the adhesive peeling tape 10 by displacing the knife 31 upward away from the substrate 1 (in an upward direction along the d-direction) just after the adhesive peeling tape 10 is peeled off from the knife 31 (see FIGS. 8B to 8C).

A controller 400 generates commands to control operations of the roller guide 23, the knife forwarding guide 37, the knife elevating guide 36, the drive mechanism 26M and the drive unit 51M, as shown in FIG. 1. In addition, detection signals of the knife contact sensor 33 and the film-end sensor 41 are transmitted to the controller 400.

Next, an operation example of the sheet peeling unit 20 in the sheet peeling machine 50 is explained with reference to FIGS. 3A to 6C.

Note that arrows indicating operation directions and only components essential to explanation are shown in FIGS. 3A to 6C.

Figure 3A:
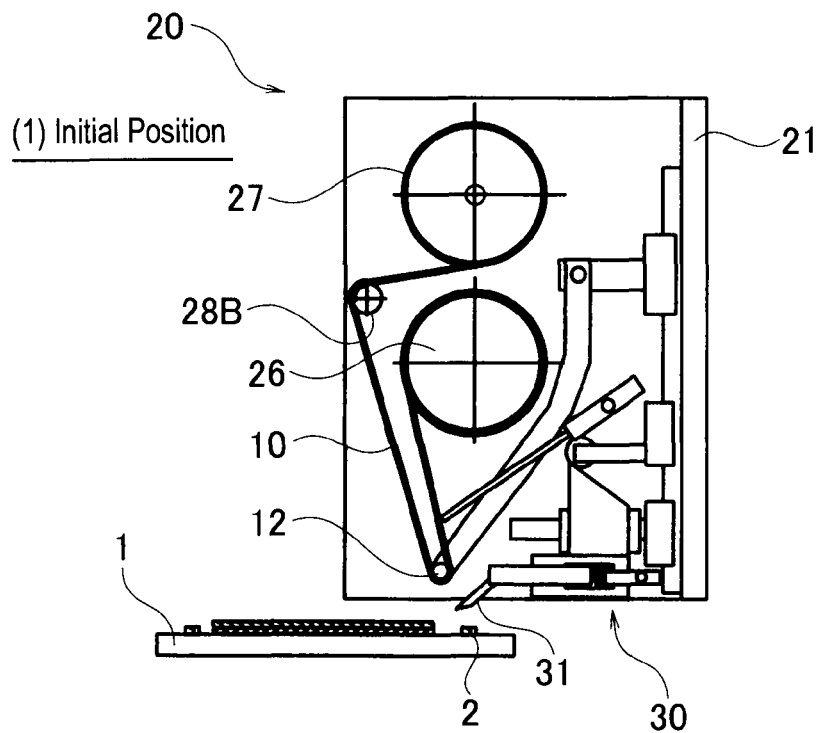
FIG. 3A is a transparent side view of the sheet peeling unit at its initial position.

FIG. 3A shows an initial state of a peeling operation of the sheet peeling unit 20, and this initial state is almost the same as the state of the sheet peeling unit 20 shown in FIG. 1. In this state, the peeling tape supply roller 27 is installed on the peeling tape axis 28. An end of the adhesive peeling tape 10 supplied from the peeling tape supply roller 27 is preliminarily wound around the tape wind-up mechanism 26 via the guide roller 28 and the tape roller 12. The substrate 1 is positioned closer to the knife 31 and the knife 31 is positioned above, but distanced from, the frit frame 2.

Figure 3B:
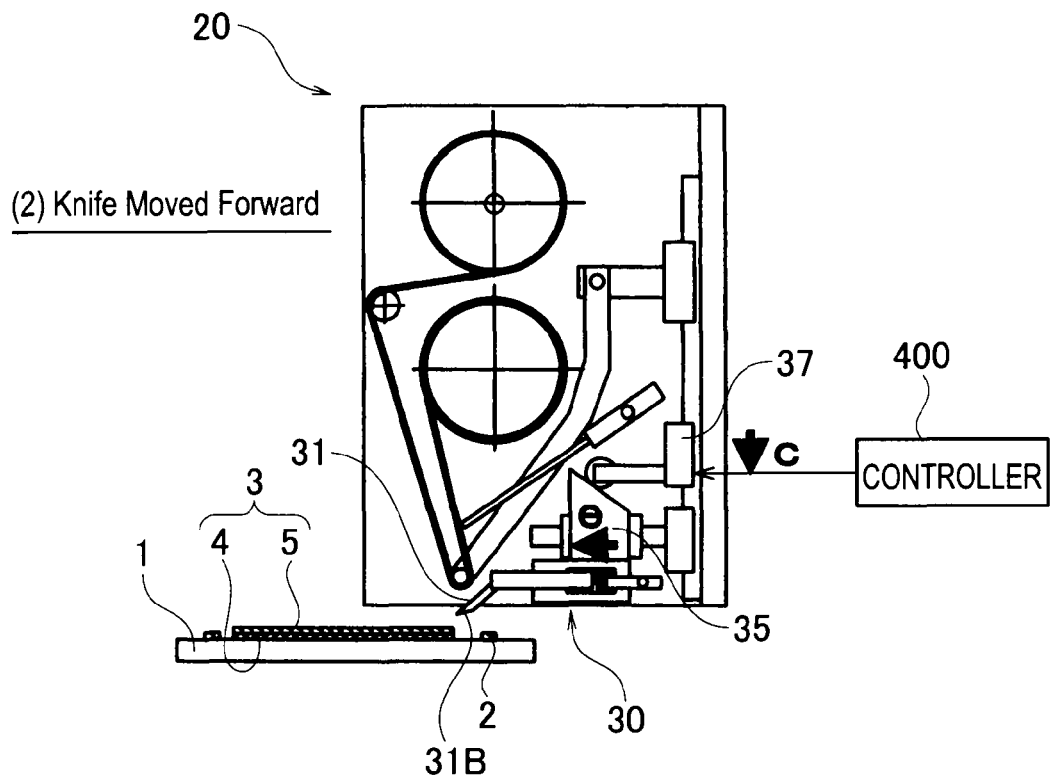
FIG. 3B is a transparent side view of the sheet peeling unit when a knife (planar member) is moved forward.

Referring to FIG. 3B, the knife forwarding guide 37 is moved downward along the c-direction according to the command from the controller 400, so that the knife unit 30 is moved forward along the e-direction. In this manner, the end edge 31B of the knife 31 is set above the edge of the adhesive sheet 3 (i.e. the edge of the protect film 5 to be peeled).

Figure 4A:
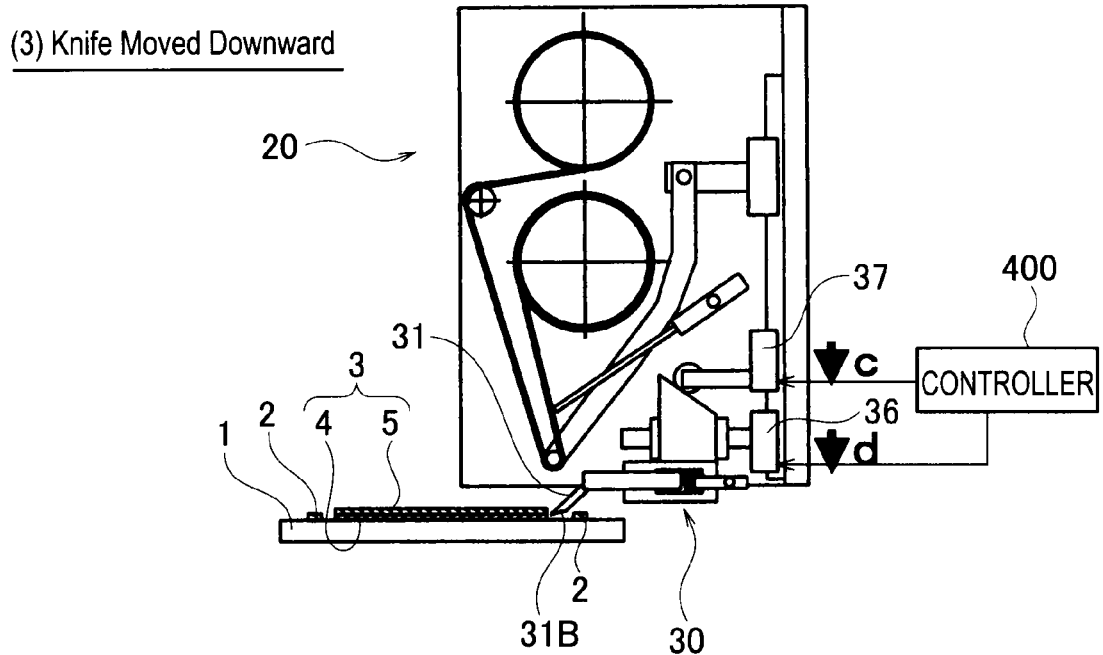
FIG. 4A is a transparent side view of the sheet peeling unit when the knife is moved downward.

Referring to FIG. 4A, the knife forwarding guide 37 is further moved downward along the c-direction and the knife elevating guide 36 is also moved downward along the d-direction in synchronization with the knife forwarding guide 37. In this manner, the end edge 31B of the knife 31 is located at the vicinity of the edge of the adhesive tape 3 without contacting the knife 31 with the frit frame 2. Here, the elevation of the end edge 31B is hold at a height level within a thickness of the adhesive 4, but prevented from contacting with the frit frame 2.

Figure 4B:
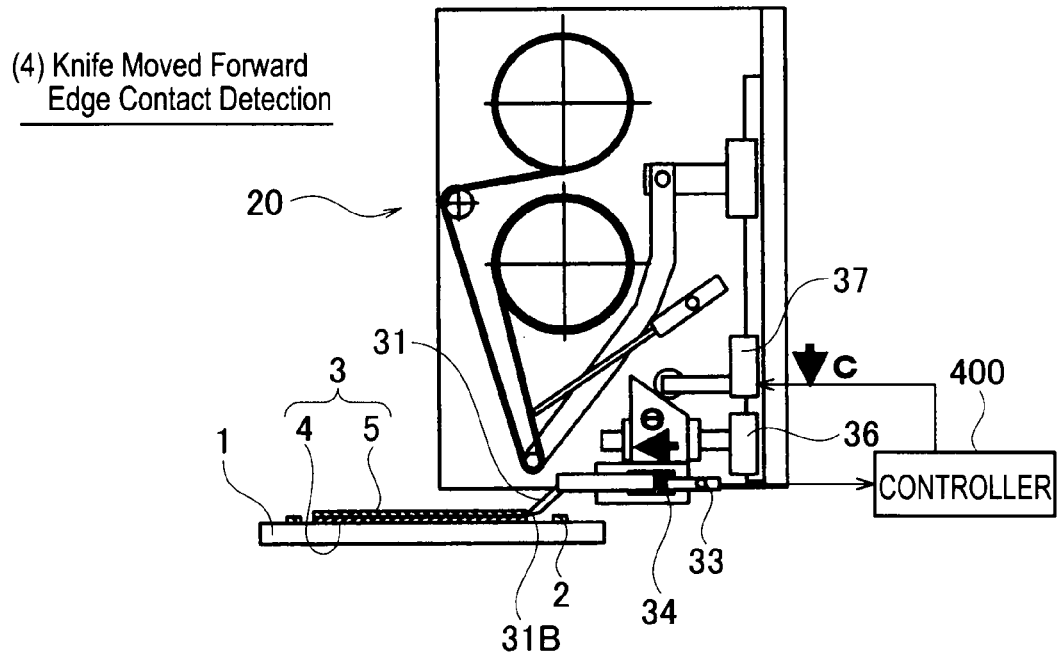
FIG. 4B is a transparent side view of the sheet peeling unit when the knife is moved forward and a contact of the knife and an edge of a protect film is detected.

Referring to FIG. 4B, the knife forwarding guide 37 is yet further moved downward along the c-direction. As a result, the knife 31 is moved forward to contact the end edge 31B with the edge surface of the adhesive 4, so that the spring 34 is compressed due to the contact. The standstill state of the knife 31 is detected by the knife contact sensor 33. Then, the controller 400 terminates the downward elevating of the knife forwarding guide 37 along the c-direction based on the sensor signal from the knife contact sensor 33.

Referring to FIG. 5A, the roller guide 23 is moved downward along the b-direction according to the command from the controller 400 to affix the adhesive surface 10P of the adhesive peeling tape 10 onto the upper surface of the knife 31 while pressing the tape roller 12 onto the upper surface of the knife 31. Referring to FIG. 5B, the roller guide 23 is further moved downward along the b-direction according to the command from the controller 400, the tape roller 12 affixes the adhesive surface 10P of the adhesive peeling tape 10 from the upper surface of the knife 31 to the upper surface of the protect film 5.

Since the tape roller 12 can continuously affix the adhesive peeling tape 10 from the upper surface of the knife 31 to the upper surface of the protect film 5 with a pressing force coincident with an angular component of the tension force of the tension spring 29 (cf. FIG. 1), a sufficiently large pressing force can be applied to the adhesive peeling tape 10 on the upper surface of the knife 31.

In this case shown in FIG. 5B, since the controller 400 stop driving of the drive mechanism 26M of the tape wind-up mechanism 26, the adhesive peeling tape 10 is pulled out from the peeling tape supply roller 27 and then supplied along an arrowed direction.

Figure 6A:
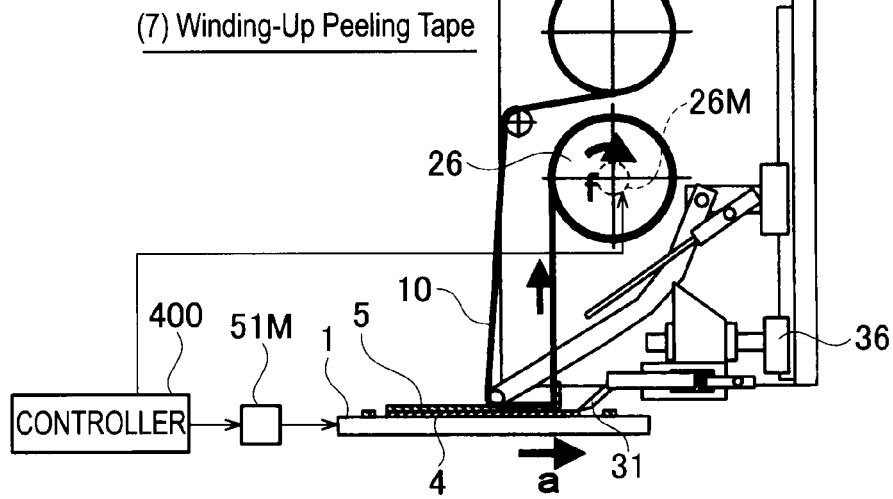
FIG. 6A is a transparent side view of the sheet peeling unit when the adhesive peeling tape is peeled.
Figure 6B:
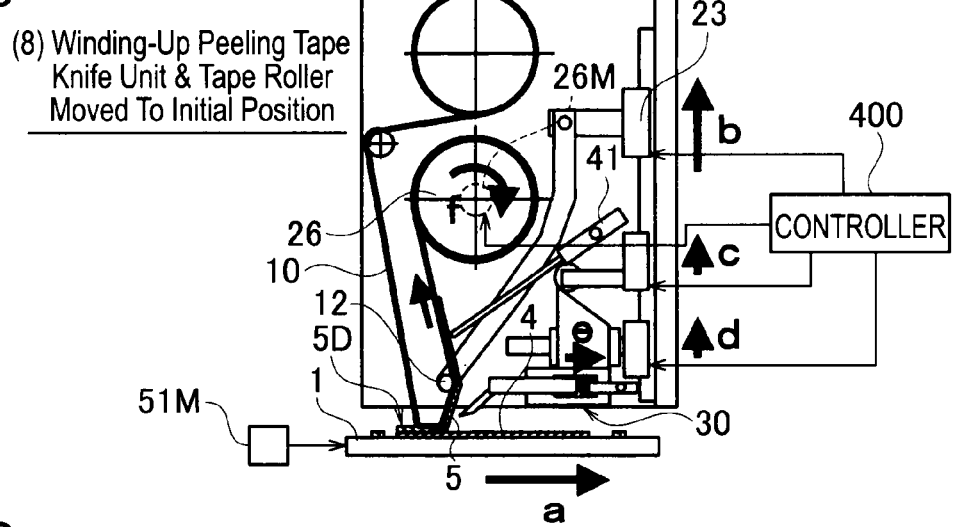
FIG. 6B is a transparent side view of the sheet peeling unit when the adhesive peeling tape is further peeled and the knife and the tape roller are moved to the initial position.

When the above-described peeling operation of the adhesive peeling tape 10 proceeds, as shown in FIG. 6A, the controller 400 drives the drive mechanism 26M of the tape wind-up mechanism 26 to wind up the adhesive peeling tape 10 along the f-direction. The protect film 5 is start to be peeled from the adhesive 4 due to this wind-up operation. At this time, as shown in FIG. 6B, the knife elevating guide 36 and the knife forwarding guide 37 are synchronously moved upward slightly along the d- and c-directions, so that the knife 31 is moved slightly upward. It is subserved by this operation to peel the protect film 5 using the adhesive peeling tape 10, and thereby the protect film 5 can be peeled easily from the adhesive 4. In addition, the substrate 1 also moved along the a-direction, and thereby the angle of the knife 31 is kept constant. Therefore, the protect film 5 can be stably peeled from the adhesive 4.

Referring to FIG. 6B, the controller 400 rotates the tape wind-up mechanism 26 in the f-direction and continuously moves the substrate 1 along the a-direction, so that the protect film 5 can be removed unfailingly. Then, the controller 400 resets the roller guide 23, the knife forwarding guide 37 and the knife elevating guide 36 to their initial positions.

Figure 6C:
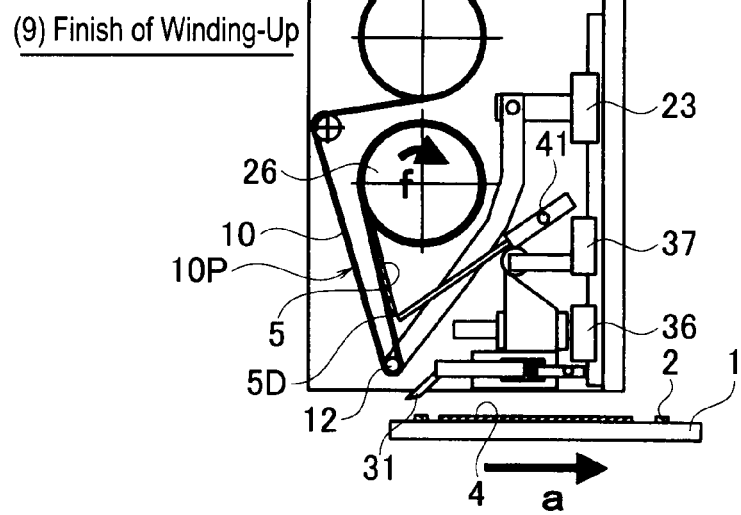
FIG. 6C is a transparent side view of the sheet peeling unit when the adhesive peeling tape and the protect film are peeled off.

Referring to FIG. 6C, when the peeling operation of the protect film 5 is finished and the film-end sensor 41 detects the end edge 5D of the protect film 5 that has removed from the adhesive 4, the controller 400 stops the tape wind-up mechanism 26 based on the detection signal from the film-end sensor 41. The sheet peeling unit 20 in this stop state is almost the same state as the initial state shown in FIG. 3A except the position of the substrate 1. The substrate 1 has been moved along the a-direction. Namely, the substrate 1 has been moved with a displacement coincident with one sheet unit on the substrate 1 in the state shown in FIG. 6C.

The above-described sheet peeling units 20 can remove unfailingly remove the protect films 5 in one column on the substrate 1 shown in FIG. 5 without contacting the adhesive surface 10P of the adhesive peeling tape 10 with its surrounding portions (e.g. the frit frame 2, a surface of devices or the like) through the above-explained peeling operation. Since the adhesive surface 10P of the adhesive peeling tape 10 is not contacted with a surface of the substrate 1 or an area formed on the surface, an element formed on the surface or the area is prevented from being contaminated and the protect film 5 can be removed easily and unfailingly.

By providing the plural sheet peeling units 20 to cope with the protect films 5 arranged in a matrix manner, the plural protect films 5 in one row can be removed at one time in a single operation.

When providing the plural sheet peeling units 20, the roller guides 23, the knife forwarding guides 37 and the knife elevating guides 36 are operated synchronously with an identical stroke (this operation is not shown explicitly in drawings). If positions of some of the protect films 5 are slightly out of alignment, the misalignments are compensated by the springs 34 and thereby the knives 31 can be made stopped at their adequate positions, respectively. The controller 400 stops the downward elevation of the knife elevating guides 37 when it is confirmed that all the knife contact sensors 33 detect the contacts of the knifes 31. In this case, the roller guides 23, the knife forwarding guides 37 and the knife elevating guides 36 in the plural sheet peeling units 20 may be synchronously operated using three rods. Of course, they may be independently operated by independent motors.

Next, explained in detail is the operation of peeling the protect film 5 from the adhesive 4 by the knife 31 and the adhesive peeling tape 10, with reference to FIGS. 7A to 8C.

Figure 7A:
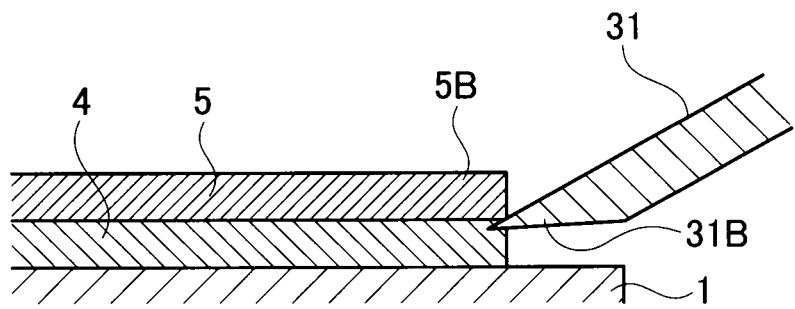
FIG. 7A is a cross-sectional view showing a state in which the knife is set to the adhesive under the protect film.

As shown in FIG. 7A, the knife 31 is set against the adhesive 4 under the protect film 5. Even if the adhesive 4 spreads over the edge 5B of the protect film 5, the end edge 31B of the knife 31 can be cut the spreading portion of the adhesive 4 (i.e. the edge surface of the adhesive 4). Therefore, the peeling force for peeling the protect film can be reduced because the spreading portion can be easily separated due to the end edge 31B of the knife 31.

Figure 7B:
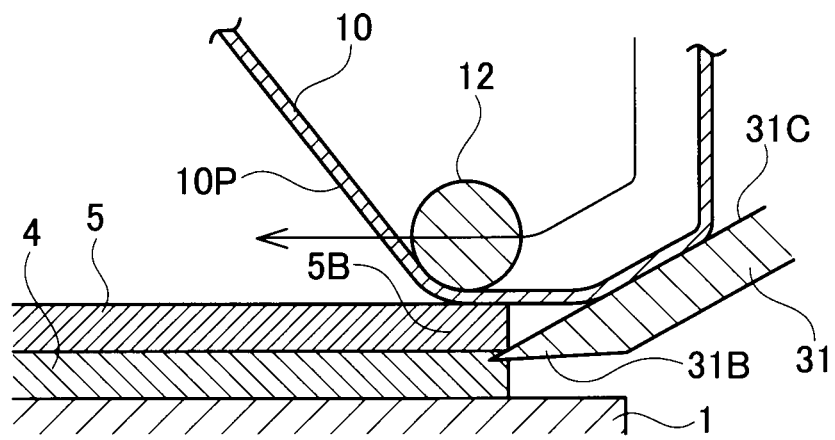
FIG. 7B is a cross-sectional view showing a state in which the adhesive peeling tape is affixed from the knife with pressed by the tape roller toward the protect film.
Figure 7C:
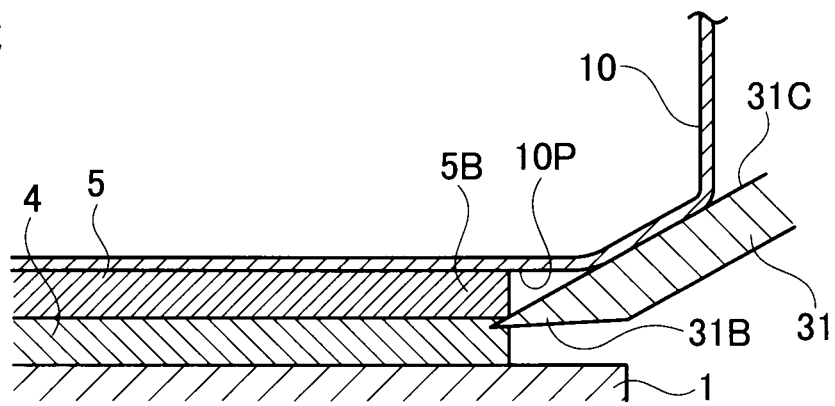
FIG. 7C is a cross-sectional view showing a state in which the adhesive peeling tape is affixed over the protect film.

As shown in FIGS. 7B to 7C, the adhesive peeling tape 10 is affixed from the upper surface 31C of the knife 31 to the upper surface of the protect film 5 while the adhesive peeling tape 10 is pressed by the press roller 12. Since the adhesive peeling tape 10 is affixed from the upper surface 31C of the knife 31 with being pressed by the tape roller 12, the adhesive peeling tape 10 can be easily and firmly affixed to the edge 5B of the protect film 5 to be peeled.

As explained above, the knife 31 can be unfailingly located at the edge 5B of the protect film 5. In addition, the adhesive strength of the adhesive peeling tape 10 onto the protect film 5 can become large due to an existence of a gap between the upper surface of the edge 5B and the upper surface 31C of the end edge 31B. Even if the adhesive 4 spreads over the edge 5B of the protect film 5, the protect film 5 can be unfailingly separated from the adhesive 4 due to the use of the knife 31. Further, the adhesive surface 10P is not contact with the substrate 1 and thereby the substrate 1 is prevented from being contaminated.

Figure 8A:
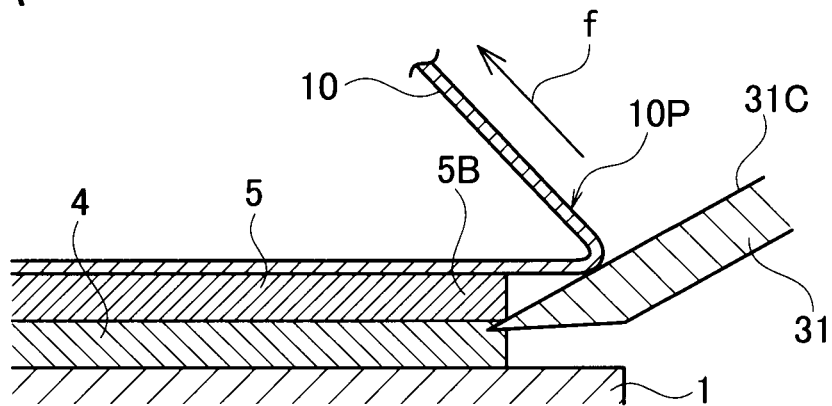
FIG. 8A is a cross-sectional view showing a state in which the adhesive peeling tape is peeled from the knife.
Figure 8B:
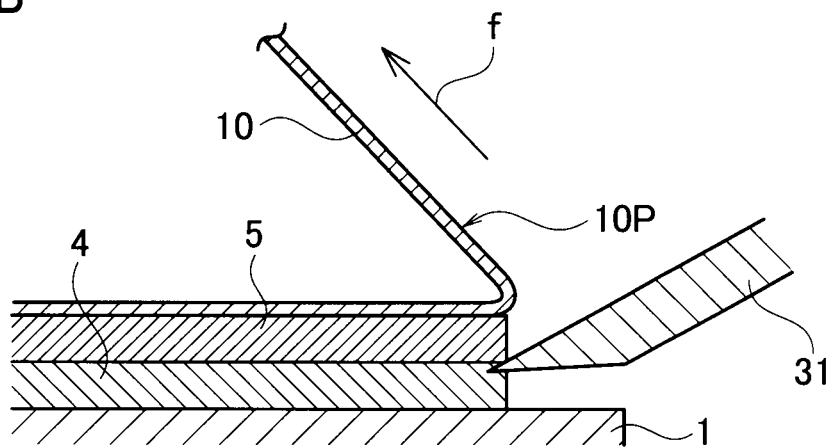
FIG. 8B is a cross-sectional view showing a state in which the adhesive peeling tape is further peeled.
Figure 8C:
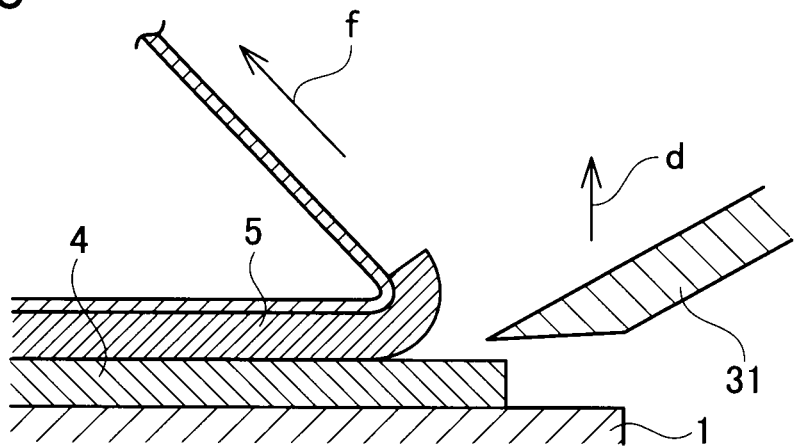
FIG. 8C is a cross-sectional view showing a state in which the adhesive peeling tape is yet further peeled together with the protect film.

As shown in FIG. 8A, the adhesive surface 10P of the adhesive peeling tape 10 is being peeled from the upper surface 31C of the knife 31. The adhesive peeling tape 10 is pulled obliquely upward along the f-direction, the protect film 5 can be peeled from the adhesive 4 gradually as shown in FIGS. 8B to 8C. The knife 31 is slightly moved upward along the d-direction apart to be distanced from the substrate 1 in synchronization with the peeling operation of the protect film 5 by the adhesive peeling tape 10. Due to this upward motion of the knife 31 along the d-direction, the protect film 5 can be peeled from the adhesive 4 unfailingly even when the adhesive 4 spreads over the protect film 5.

Figure 9:
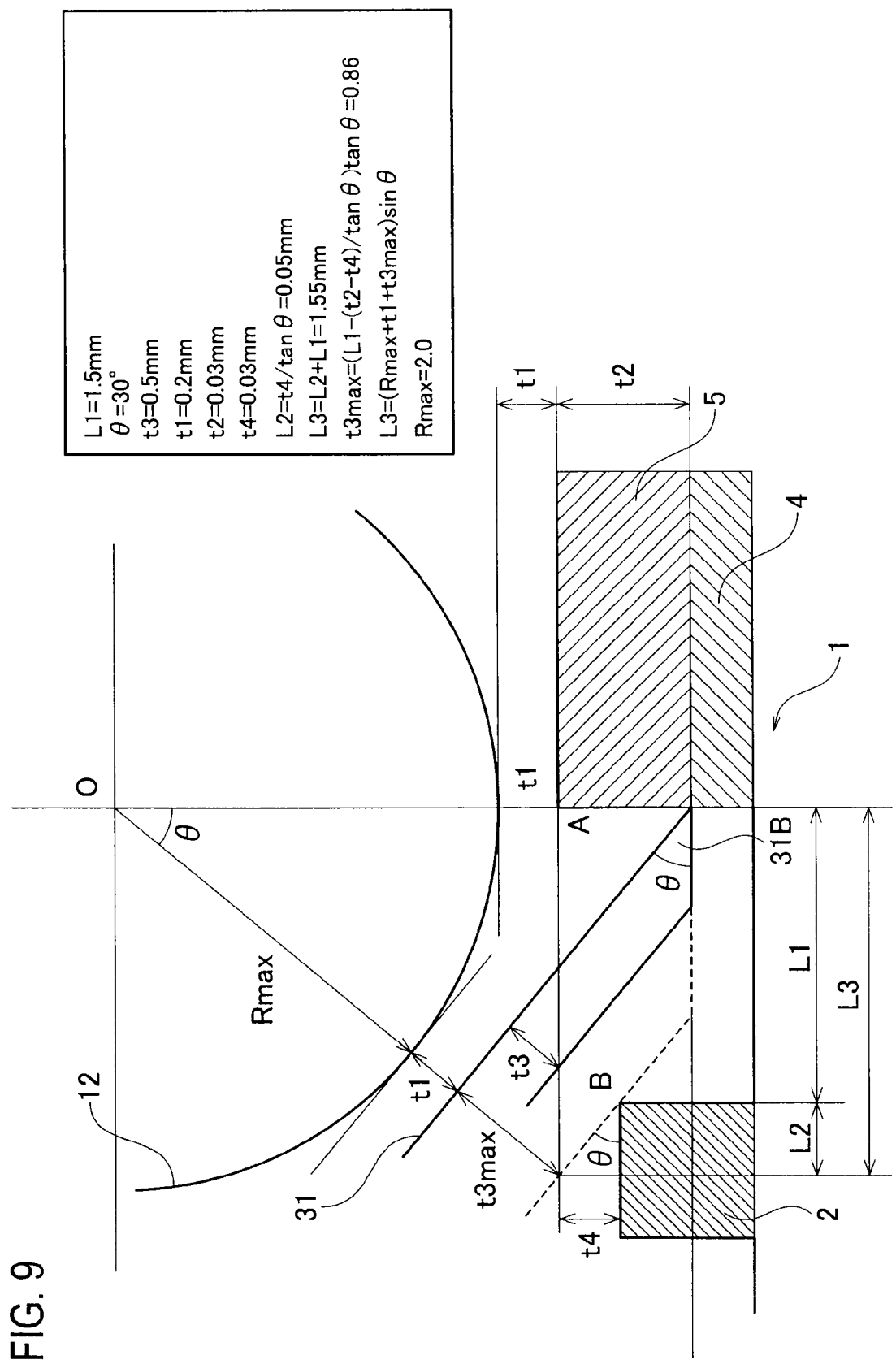
FIG. 9 is a schematic side view explaining calculations for actual dimensional values in the embodiment.

Next, explained are calculations for actual dimensional values in the embodiment with reference to FIG. 9.

In a case where the protect film 5 is affixed so as to set the distance L1 between the frit frame 2 on the substrate 1 and the protect film 5 to 1.5 mm, the angle θ between the knife 31 and the substrate 1 is set to 30 degree, the thickness t1 of the adhesive peeling tape 10 is set to 0.2 mm, the thickness t2 of the protect film 5 is set to 0.03 mm, and the thickness t3 of the knife 31 is set to 0.5 mm. In this case, if the thickness t3 is less than its maximum thickness t3max=0.86 mm, the knife 31 is not contact with the frit frame 2. When t3=0.5 mm, there is a gap of 0.36 mm (=t3max−t3). The end edge 31B of the knife 31 can be set without contacting with the frit frame 2 by utilizing the gap. In addition, if the diameter of the tape roller 12 is less than 4 mm (=2×Rmax), the center of the tape roller 12 is positioned on the side of the knife 31 from the edge of the protect film 5. Therefore, the gap between the upper surface of the end edge 31B and the upper surface of the protect film 5 is ensured, so that a larger pressing force can be applied to the adhesive peeling tape 10 on the edge of the protect film 5. This point is a major advantage in the embodiment.

Figure 10:
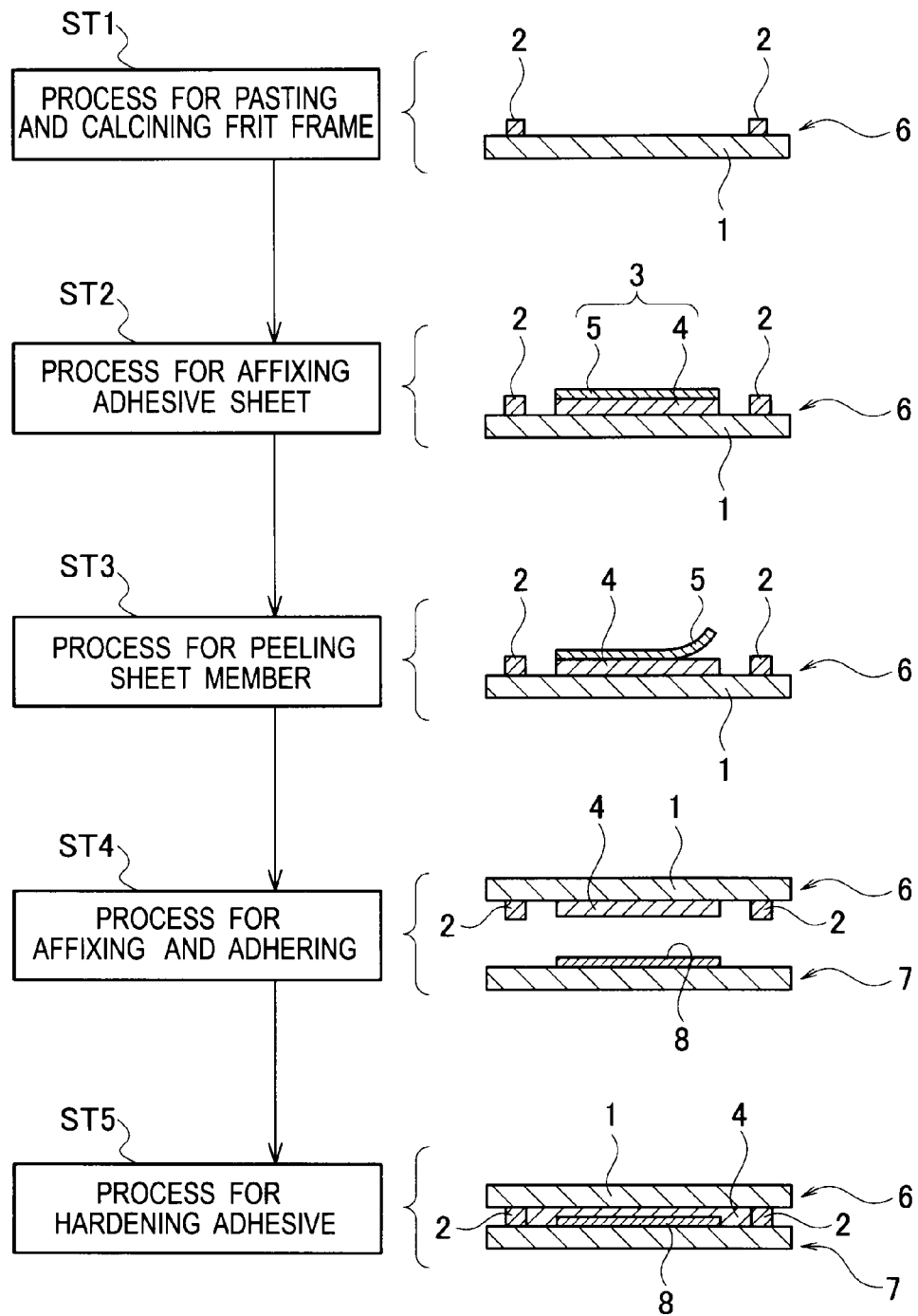
FIG. 10 is a flow chart of an embodiment of a method for manufacturing a display device using the peeling machine.

FIG. 10 shows a flow chart of a method for manufacturing a display device using the peeling machine 20. In a process for pasting and calcining frit frame ST1, the frit frame 2 is pasted on a sealing substrate 6 and then calcined. In a process for affixing adhesive sheet ST2, the adhesive 4 of the adhesive sheet 4 is layered within the frit frame 2 on the sealing substrate 6. The protect film 5 is being affixed on the adhesive 4. For example, the adhesive 4 is a thermosetting resin film.

In a process for peeling sheet member ST3, the protect film 5 is removed from the adhesive 4 by the above-described sheet peeling machine 50. Specifically, the knife 31 is set at the edge of the protect film 5 to contact the adhesive peeling tape 10 with the edge of the protect film 5. Then, the adhesive peeling tape 10 is affixed continuously from the knife 31 to the protect film 5 while being pressed. Then, the adhesive peeling tape 10 is peeled off from the knife 31 to remove the protect film 5. In this manner, the protect film 5 is removed from the adhesive 4.

In a process for process for affixing and adhering ST4, the sealing substrate 6 on which the adhesive 4 is layered and a luminous-element substrate 7 having a luminous-element area 8 are affixed each other. Then, the frit frame 2 is melted to bond the sealing substrate 6 and the luminous-element substrate 7 under reduced pressure or vacuum. In a process for hardening adhesive ST5, the adhesive 4 between the sealing substrate 6 and the luminous-element substrate 7 is heated and then hardened.

According to the method for manufacturing a display device, when manufacturing the display device, the adhesive peeling tape 10 is affixed onto the protect film 5 affixed on the substrate 1 by use of the adhesive 4, and the protect film 5 can be removed unfailingly without contacting the adhesive peeling tape 10 with the substrate 1 or the area formed on the substrate 1. Specifically, the adhesive peeling tape 10 is affixed from the knife (planar member) 31 to the protect film 5 to be removed with being pressed. Therefore, the protect film 5 can be removed while the adhesive peeling tape 10 is never contacted with the surface of the substrate 1.

There is a conventional method for a product that needs a peeling process of a protect film affixed onto a substrate on which a functional film is formed such as an organic EL (electroluminescent) panel. In this conventional method, an adhesive peeling tape (also referred as a peeling tape) is affixed onto the protect film and then the protect film is removed together with the peeled adhesive peeling tape. In order to remove the protect film unfailingly, it is needed that the adhesive peeling tape is firmly affixed onto an edge of the protect film to be peeled. However, there is much probability of contaminating the surface of the substrate due to a contact of the adhesive peeling tape with the substrate.

According to the present embodiment, the knife (the planar member with an knife-edge shape) 31 is located at the edge 5B of the protect film 5 to be peeled without contacting with the substrate 1. Therefore, the protect film 5 can be removed unfailingly without contacting the adhesive peeling tape 10 with the surface of the substrate 1 or the area formed on the surface and also without contaminating the surface of the substrate 1 or the area on the surface.

The present invention is not limited to the above-described embodiment. For example, the adhesive peeling tape 10 peels off the protect film 5 from the adhesive (layer) 4 in the above-described embodiment. However, as need arises, the adhesive peeling tape 10 may peel off (remove) both of the protect film 5 and the adhesive (layer) 4 as a whole. In other words, the protect film (sheet member) 5 may be peeled off (removed) together with the adhesive (layer) 4 [an entire of the adhesive sheet 3 may be removed].

Figure 11:
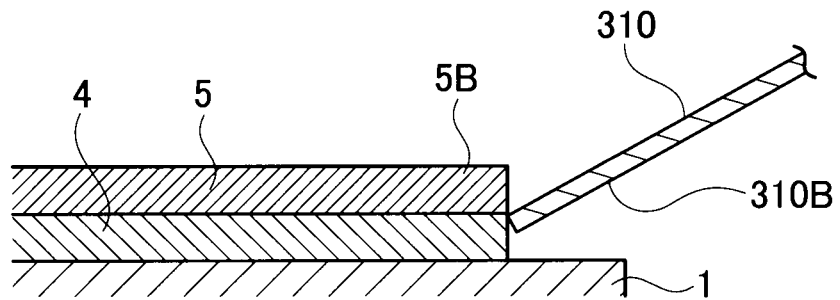
FIG. 11 is a cross-sectional view showing another embodiment of the planar member (thin plate member)
Figure 12:
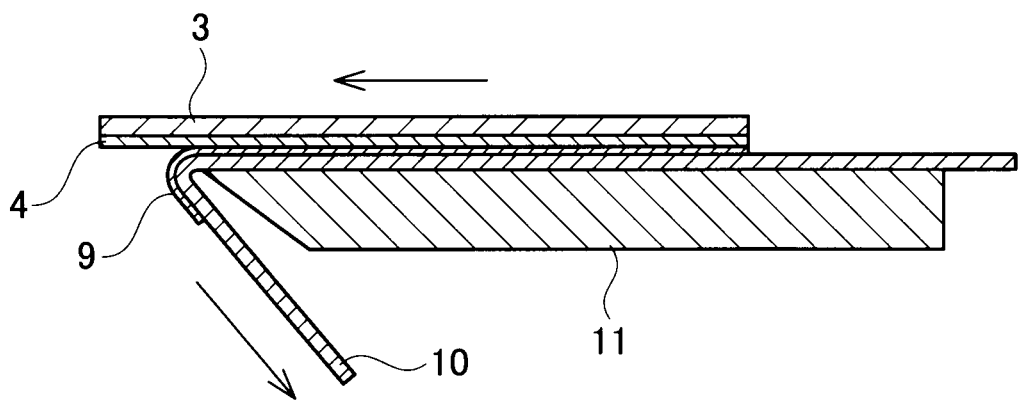
FIG. 12 is a cross-sectional view showing a state in which a protect film is peeled by a adhesive peeling tape in a conventional way.
Figure 13:
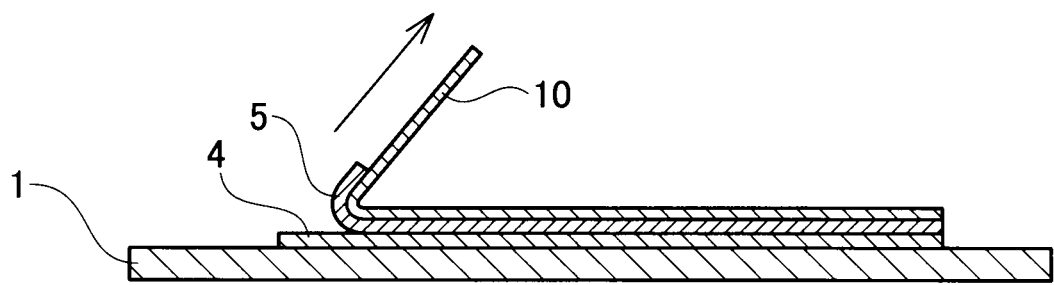
FIG. 13 is a cross-sectional view showing a state in which a protect film is peeled by a adhesive peeling tape in another conventional way.
Figure 14:
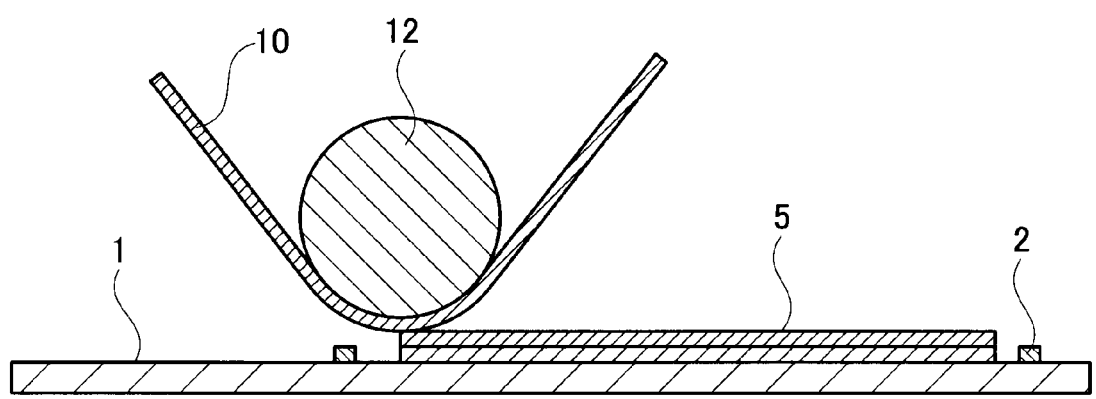
FIG. 14 is a cross-sectional view showing a state in which a protect film is peeled from an organic EL panel in yet another conventional way.
Figure 15A:
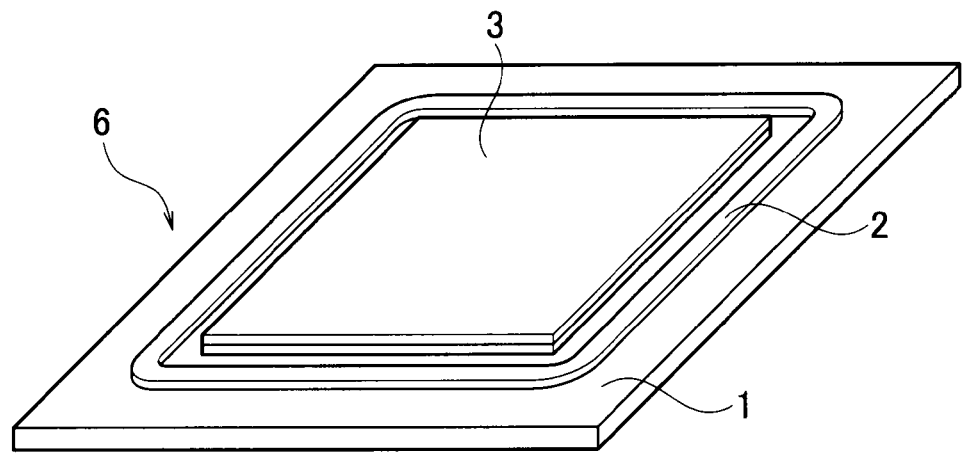
FIG. 15A is a perspective view showing a sealing substrate, the protect film of an adhesive sheet affixed thereon and so on in the organic EL panel.
Figure 15B:
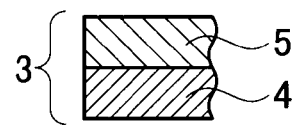
FIG. 15B is a cross-sectional view of the adhesive sheet composed of the protect film and an adhesive.
Figure 16:
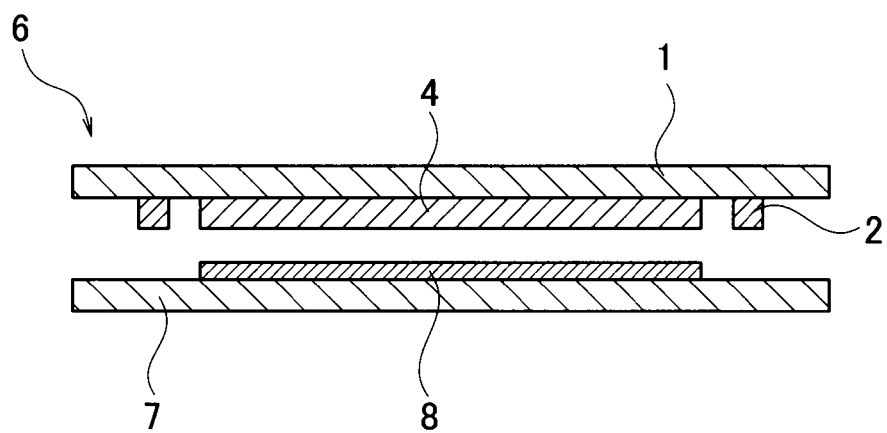
FIG. 16 is a cross-sectional view showing the sealing substrate, a luminous-element substrate and so on in the organic EL panel.

In the above-described embodiment, the protect film 5 is provided with the adhesive (layer) 4 and the end edge 31B of the knife (planar member) 31 is contacted with the adhesive (layer) 4 at the edge 5B of the protect film (sheet member) 5. Here, the end edge 31B is formed as a knife-edge. However, as shown in FIG. 11, the planar member may be a thin plate member 310 that has an end edge 310B with thin thickness that is not formed as a sharp knife-edge, as long as its end edge 310B can be contacted with the adhesive (layer) 4.

In addition, the knife (planar member) 31 may be set so as to contact its end edge 31B with the adhesive (layer) 4 at a position nearer to the surface of the substrate 1. According to this, the knife (planar member) 31 can be located at the edge 5B of the protect film (sheet member) 5 to be peeled unfailingly and the gab between the upper surface of the edge 5B and the upper surface 31C of the end edge 31B can be ensured to obtain a large adhesive strength of the adhesive peeling tape 10 due to a large pressing force for the tape roller 12.

Further, the present invention can take variations by combining the constituent elements disclosed in the above-described embodiment. For example, some of the constituent elements disclosed in the above-described embodiment may be omitted. Furthermore, the constituent elements in different embodiments may be combined arbitrarily.

While certain embodiments have been described, these embodiments have been presented by way of example only, and are not intended to limit the scope of the inventions. Indeed, the novel machines and methods described herein are intended to cover such forms or modifications as would fall within the scope and spirit of the invention.

What is claimed is:

1. A sheet peeling machine comprising:
a movable table capable of moving a substrate laid on the movable table in a moving direction;
a planar member;
a holder that holds the planar member;
an elevating unit capable of moving the holder in an elevating direction perpendicular to the moving direction, the holder being supported by the elevating unit and capable of moving parallel to the moving direction;
a forwarding unit capable of contacting an end of the planar member with an edge of a sheet member affixed on the substrate, the substrate being laid on the movable table, by pushing the holder parallel to the moving direction to forward the planar member after elevating the holder downward in the elevating direction by the elevating unit;
a tape roller for continuously affixing a peeling tape from the planar member to the sheet member with the end of the planar member and the edge of the sheet member being in contact with each other by pressing the peeling tape while being moved in an opposite direction to the moving direction; and
a tape wind-up unit for peeling off the sheet member together with the peeling tape by winding up the peeling tape while the movable table is moved in the moving direction.

2. The sheet peeling machine according to claim 1, wherein the sheet member is provided with an adhesive layer and affixed on the substrate via the adhesive layer,
the end of the planar member is formed as a knife-edge, and
the end of the planar member is contacted with an edge of the adhesive layer of the sheet member.

3. The sheet peeling machine according to claim 1, wherein the sheet member is provided with an adhesive layer and affixed on the substrate via the adhesive layer,
the planar member is a thin plate member, and
the end of the planar member is contacted with an edge of the adhesive layer of the sheet member.

* * * * *